A. P. WYATT.
TRUCK.
APPLICATION FILED OCT. 6, 1911.
1,035,293.
Patented Aug. 13, 1912.
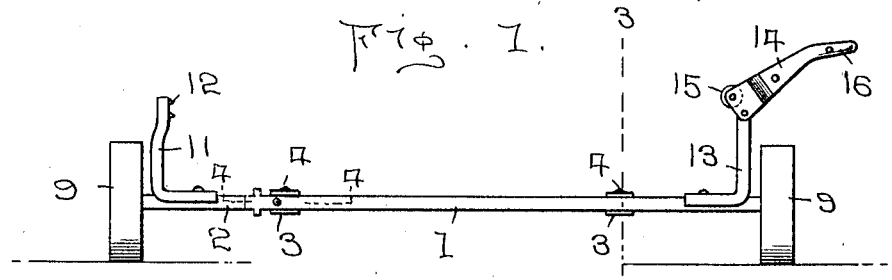
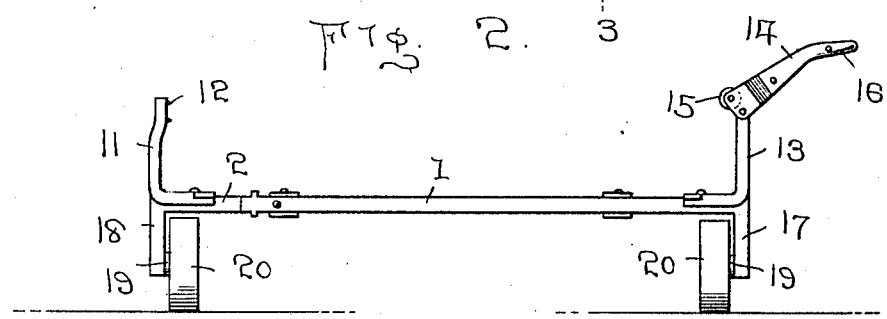
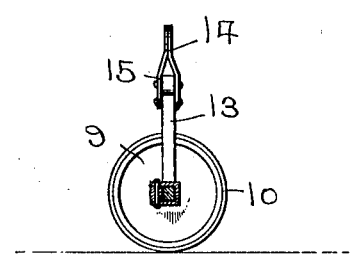
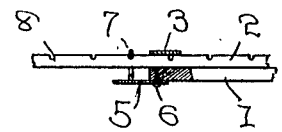
WITNESSES:
INVENTOR
A. P. Wyatt
BY
W. J. Fitz Gerald
Attorneys

UNITED STATES PATENT OFFICE.

ALBERT P. WYATT, OF BEATRICE, NEBRASKA.

TRUCK.

1,035,293.  Specification of Letters Patent.  Patented Aug. 13, 1912.

Application filed October 6, 1911. Serial No. 653,125.

*To all whom it may concern:*

Be it known that I, ALBERT P. WYATT, citizen of the United States, residing at Beatrice, in the county of Gage and State of Nebraska, have invented certain new and useful Improvements in Trucks; and I do hereby declare the following to be a full, clear, and exact description of the invention, such as will enable others skilled in the art to which it appertains to make and use the same.

This invention relates to trucks and more particularly to trucks especially adapted for handling trunks, boxes, etc.

An object of the invention is to provide a truck which may be readily attached to a trunk or the like for ready handling of the same, without injuring walls, floors, floor coverings, etc.

Another object is to provide a device of this character upon which the trunk or other object may be readily rolled from place to place, and which cannot become accidentally disengaged from the device being transported.

Another object is to provide a device of this nature which may be composed of a small number of parts of simple form, and which therefore may be readily and cheaply manufactured and are light in weight.

Other objects and advantages will be hereinafter set forth and pointed out in the specification and claims.

In the accompanying drawings which are made a part of this application, Figure 1, is a front elevational view of the device, Fig. 2, is a similar view, showing a slightly modified form, Fig. 3 is a vertical sectional view on the line 3—3 of Fig. 1, and Fig. 4 is a top plan view of a portion of the roller rods, partly in section to clearly show the means for locking the bars in adjusted positions.

Referring more particularly to the drawings in which similar reference numerals designate corresponding parts throughout the several views, 1 and 2 indicate the parallel bars which are positioned side by side and are adapted to be held in adjusted positions longitudinally of one another, as will be later described. The bar 1 carries the guide sleeves 3 secured thereto near the opposite ends of the bar by suitable bolts 4 or other fastening means. The guide sleeves 3 are extended from one side of the bar 1 a sufficient distance to allow the bar 2 to slide therein, and to hold said bar 2 against the bar 1. Extending outwardly from one end of the bar 1 is the leaf spring 5 which may be fastened to the end of the bar 1 by a pin 6 or in any preferred manner. Integral or rigid with the free end of the leaf spring 5 is the substantially U-shaped locking finger 7 which fits loosely around the bar 2 when the latter is in position against the bar 1, and engages within the spaced notches 8 formed in the outer side of the bar 2. The finger 7 being secured to or carried by the leaf spring 5 is normally held within the proper notch 8 by the tension of said spring.

Upon the opposite ends of the bars 1 and 2 are suitable wheels or rollers 9 which may, if desired be rubber tired, as clearly shown at 10 in Fig. 3. The rollers or wheels 9 serve as means upon which to roll the truck with the object thereupon, without having to raise the truck and object from the floor or ground.

Extending upwardly from the end of the bar 2, upon which the wheel 9 is carried, is the L-shaped object engaging arm 11, the short portion of which is secured to the bar 2, while the long portion extends upwardly therefrom, and may be provided with suitable teeth 12 to prevent the arm from slipping while engaged against the object. A similar arm 13 is secured in a like manner to the bar 1 near the opposite end of the device and to the upper end of this arm 13 is pivoted one lower corner of the bifurated lever 14. The lower end of the lever 14 is suitably bifurcated to permit of one lower corner being secured to the upper end of the arm 13, as previously stated, while an antifriction roller 15 is carried in the other lower corner thereof, the lower corner within which a roller 15 is carried being toward the opposite end of the device, and upon which end is carried the arm 11. The upper end of the lever 14 may be directed outwardly, as shown at 16 to permit of ready grasping of the lever, and manipulation thereof.

In the modified form, as shown in Fig. 2, the outer ends of the bars 1 and 2 are directed downwardly, as shown at 17 and 18, respectively and within the lower extremities of these downwardly directed ends are suitable stub shafts 19 upon which the wheels 20 are mounted, said wheels being in this instance beneath the bars 1 and 2. This arrangement raises the bars 1 and 2 farther from the floor or ground and also permits of the truck being shortened so as to require a space equal only to the width of the article handled thereby plus the thickness of the arms 11 and the lever 14 when the latter is in a substantially vertical position, as will be understood.

The roller 15 may be of greater diameter through its central portion than at its opposite ends or may be of any form desired. The lever 14 may be formed of two similar metallic pieces riveted together or of one solid piece bifurcated at its lower end to accommodate the roller 15 and the outer end of the arm 13. The other parts of the truck may be formed of any strong material of like weight, preferably metal.

In employing the truck for transporting an object, such as a trunk, from one place to another the manner of attaching the truck to the object and handling the same may be as follows: The object, (a trunk for instance) is placed upon one end and the truck engaged adjacent one end thereof, preferably the end nearest the floor and the leaf spring 5 pressed toward the bar 2, to disengage the finger 7 from within the notch 8 after which the bar 2 may be moved longitudinally of the bar 1, until the arms 11 and 13 are adjacent opposite sides of the truck. The lever 14 is then swung inwardly and against one side of the trunk. It will be understood that the arms 11 and 13 have been moved to positions close enough to the opposite sides of the truck to compel the roller 15 to be pressed tightly against the trunk during the swinging of the lever 14 causing the teeth 12 in the long portion of the lever 11 to bite into the trunk sufficiently to prevent slipping of the arm 11. The teeth 12, however, are not large enough to damage the surface of the trunk. The locking finger 7 will automatically engage within the proper notch 8 and prevent the bars 1 and 2 from sliding, thus locking together said bars. The lever 14 being pivoted so as to swing upon the free end of the arm 13, and the roller 15, thus being compelled to move in an arc, prevents the lever 14 from being swung away from the trunk until the spring 5 is pressed toward the bar 2 to allow the disengagement of the locking finger 7 from the notch 8. Thus the truck is securely fastened to the trunk and the same may be readily tilted until the wheels 9 engage the floor or ground, after which the trunk and truck may be readily rolled upon said wheels to any point desired. The trunk may be left upon the truck until the destination is reached, and the trunk rolled to its resting place, if desired.

It will thus be seen that I have provided a truck which will be very handy to draymen, and others and one which may be readily carried within a wagon when not in use, as the device is extremely light in weight, and requires only a very small space when not in use, as well as when being employed for transporting trunks, boxes, etc.

Owing to the extremely small number of parts included in this truck and the simple formation of the same, it will be evident that the device may be easily and cheaply manufactured and will be highly efficient in use.

What I claim is:

1. A device of the class described comprising longitudinally adjustable parallel bars, means carried by one of said bars for retaining the bars parallel of one another, means carried by the inner end of one of said bars for holding the bars in adjusted relation to one another, wheels carried by said bars, object engaging means projecting at right angles from said bars and a lever pivoted to one of said object engaging means.

2. A device of the class described comprising longitudinally adjustable parallel bars, means for locking said bars in adjusted position, said bars being adapted to receive an object thereupon, means projecting from each bar for engagement against opposite sides of the object upon the bars, means for tightening the engaging means against the object and preventing slipping of said means, antifriction means carried by the tightening means, means for holding the bars against one another, and means carried by the bars upon which the device and object thereupon may be rolled from place to place.

3. A device of the class described comprising bars positioned parallel to one another, said bars being adjustable longitudinally, means for retaining the bars in adjusted position, arms carried by said bars and extending parallel to one another, and at right angles to the bars, one arm being carried by each bar, means carried by one arm for biting into an object, a lever pivoted upon the other arm, said bars being adapted to carry an object received thereupon, said lever being adapted to tighten the device against the object thereupon, an antifriction roller carried by said lever for direct engagement against the object, and wheels carried by said bars.

In testimony whereof I have signed my name to this specification in the presence of two subscribing witnesses.

ALBERT P. WYATT.

Witnesses:
H. E. SACKETT,
S. K. HENTGES.

Copies of this patent may be obtained for five cents each, by addressing the "Commissioner of Patents, Washington, D. C."